Dec. 18, 1934.   J. P. FRENCH   1,984,735
PUMP DRIVING MECHANISM
Filed Nov. 7, 1932   2 Sheets-Sheet 1
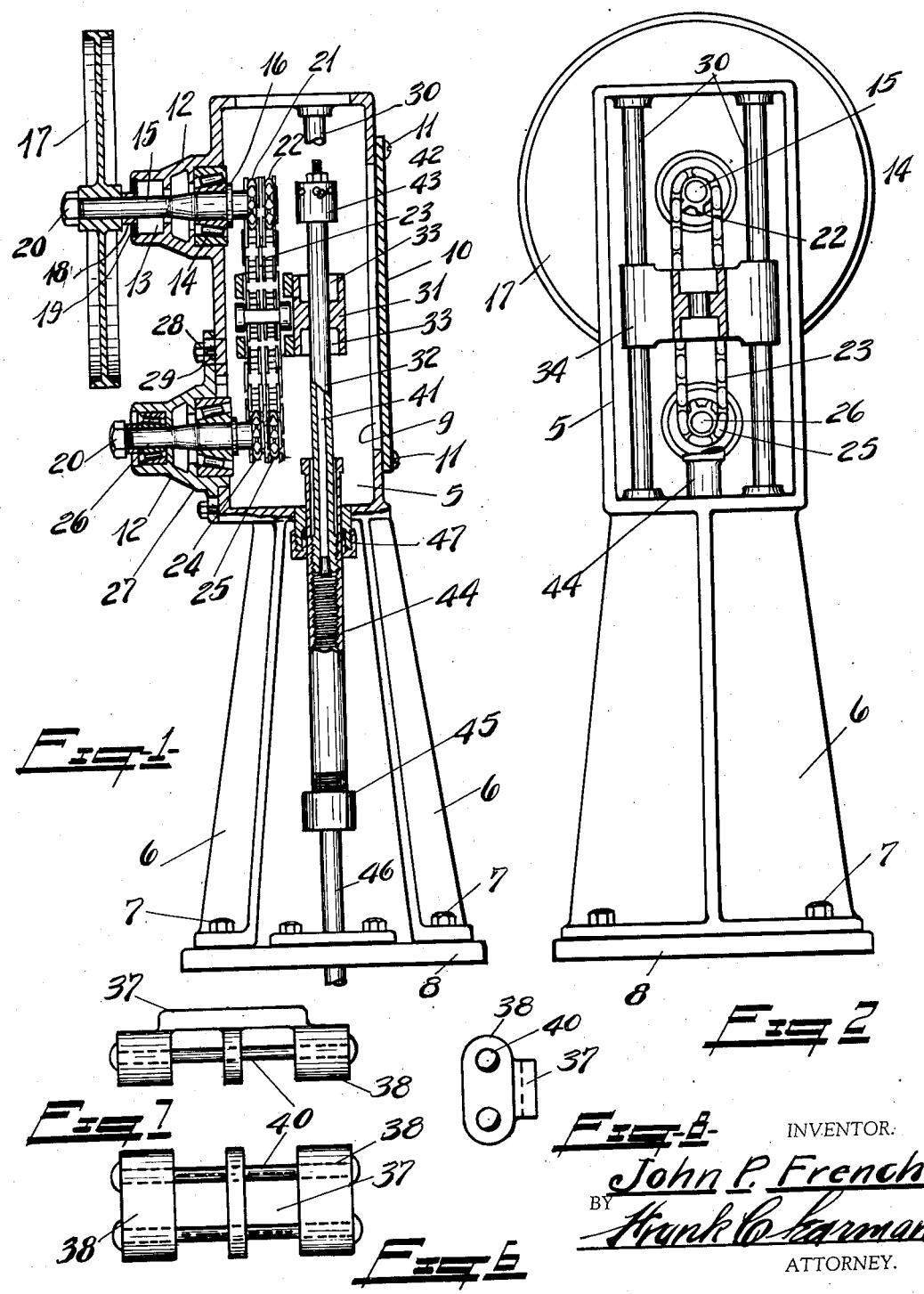
INVENTOR.
John P. French.
BY Frank C. Karman
ATTORNEY.

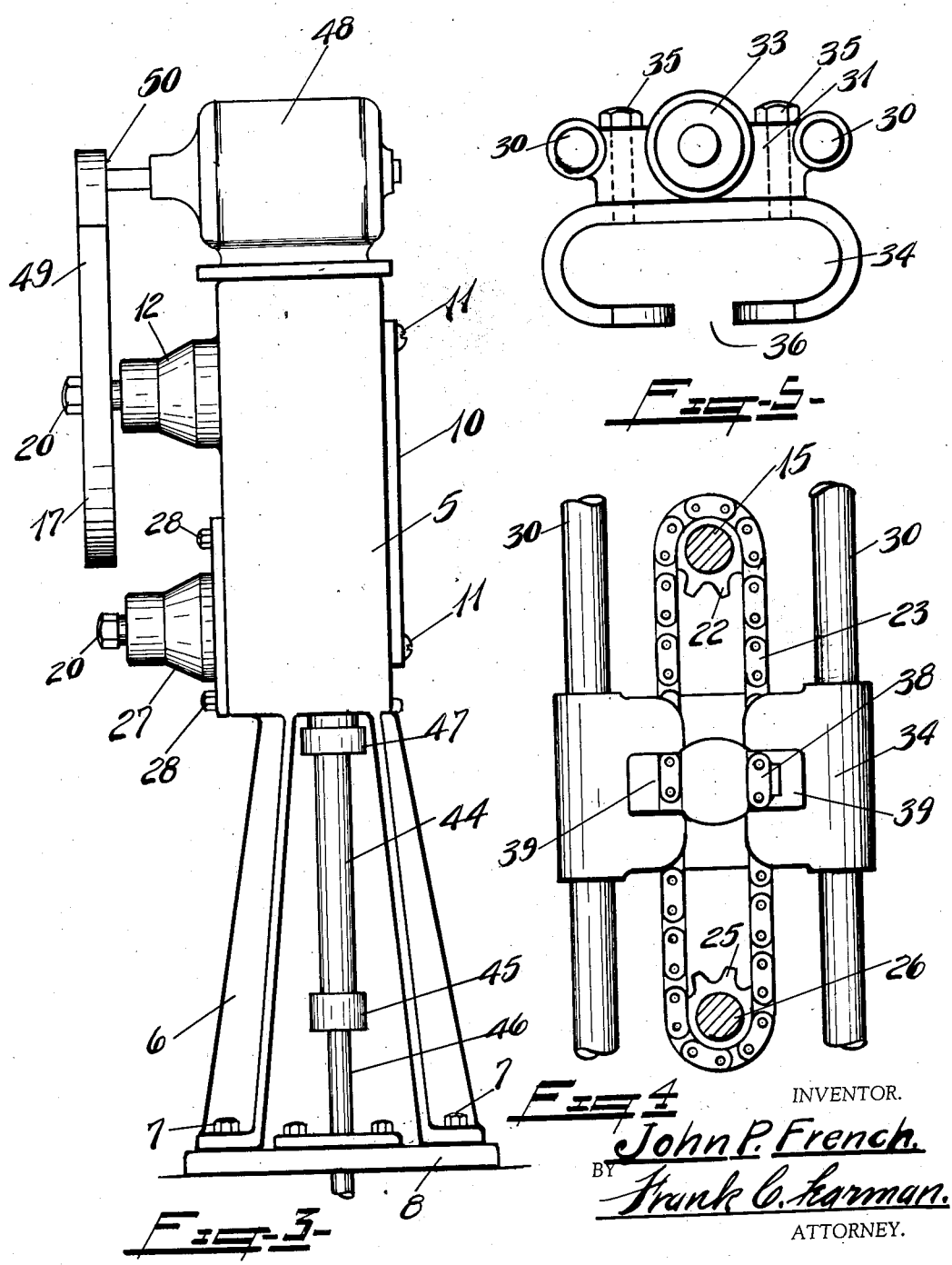

UNITED STATES PATENT OFFICE 1,984,735

PUMP DRIVING MECHANISM

John P. French, Alma, Mich., assignor of twenty-five per cent to Henry S. Babcock and twenty-five per cent to John S. Knoertzer, both of Alma, Mich.; Frank O. Parker administrator of said John P. French, deceased Application November 7, 1932, Serial No. 641,684

7 Claims. (Cl. 74—37)

This invention relates to pump driving mechanism, and more specifically to a mechanism in which simple and positive means is provided for adjusting the pump stroke to suit wells of varied flow.

Another object is to design a pump driving mechanism of simple and substantial construction, which is adaptable to any type of piston pump, which is composed of few parts, all readily accessible for repair or renewal, and which can be readily manufactured and assembled.

A further object is to provide a pump driving mechanism which will be practically noiseless in operation, which provides for a straight line drive, and provide means for absorbing shocks caused by reversing the stroke.

The above and other objects will appear as the specification progresses, reference being had to the accompanying drawings, in which I have shown one embodiment of my invention, and in which like reference numerals indicate like parts throughout the several views thereof.

In the drawings—

Fig. 1 is a fragmentary part sectional front view showing my pump driving mechanism.

Fig. 2 is a front view with the cover plate removed.

Fig. 3 is a side view of the device with a motor in position.

Fig. 4 is an enlarged fragmentary back view of the cross head guide and driving chain.

Fig. 5 is a plan view of the crosshead and yoke.

Fig. 6 is an enlarged detail of the driving link.

Fig. 7 is a plan view.

Fig. 8 is an end view thereof.

Referring now more particularly to the drawings, the numeral 5 indicates the housing in which the pump driving mechanism proper is mounted. Legs 6 are cast integral with this housing, and bolts 7 serve to secure it to a base 8 in the usual manner, an opening 9 being provided in the front of the housing, and a plate 10 forms a cover and closure for said opening and is secured in position by means of bolts 11 in the usual manner.

An outwardly projecting bearing support 12 is formed integral with the back wall of the housing and roller bearing assemblies 13 and 14 respectively are mounted in said support, said bearing assemblies being of conventional design, and it is not deemed necessary to describe them in detail.

A drive shaft 15 is journaled in the bearings 13 and 14, the inner end being tapered and of larger diameter, and a shoulder 16 is formed on said shaft and engages the inner raceway of the bearing 14 to limit the outward movement of the shaft. A drive pulley 17 is mounted on the outer end of the shaft, and a spacer sleeve 18 is interposed between the end of the bearing and the pulley as shown, a felt washer 19 being mounted in the end of the bearing support to form a leakproof joint thereat. A nut 20 is threaded on the end of the shaft to secure the pulley in position and to permit adjustment to take up slack or wear in the bearings.

Dual sprockets 21 and 22 are provided on the inner end of the shaft in spaced apart relation, and a driving chain 23 is trained thereover, said chain being connected to and driving similar sprockets 24 and 25 which are mounted on the shaft 26, this shaft being mounted in exactly the same manner as is the shaft 15, excepting that the bearing support 27 is cast separate and is secured to the housing by means of bolts 28, slotted openings 29 being provided in the flange so that it can be adjusted to tighten the driving chain when required.

Guide rods 30 are provided in the housing in spaced apart relation, and a cross head 31 is mounted to slide thereon, said cross head being centrally bored to accommodate a tubular rod 32, and dashpots 33 are formed on said cross head to absorb the shocks as the mechanism is operated. A yoke member 34 is secured to the cross head by means of bolts 35, or it can be cast integral therewith if desired, the back of the yoke being formed with an opening 36 to accommodate the shafts 15 and 26 respectively.

A special driving link 37 is provided in the drive chain and is formed as clearly shown in Figs. 5 and 6 of the drawings, driving lugs 38 being formed integral therewith and project beyond the links of the chain to permit engagement with openings 39 provided in the yoke, the link pins 40 securing this special link in proper position in the chain.

The tubular rod 32 is hollow to accommodate a bolt 41 which is mounted therein, the upper end of the rod being threaded, and a nut 42 is threaded thereon, the upper end of the rod being squared, and a castillated piston 43 is rigidly mounted thereon, said piston being provided with openings to permit the turning of the rod as required to provide the proper stroke, said piston being adapted to be engaged by the cross head as the mechanism is operated. The lower end of the bolt 41 is enlarged and tapered to fit and form a closure for the lower end of the rod 32, the end section of which is enlarged and threaded to engage the internally threaded hollow piston rod 44, the opposite end of said rod being externally threaded to receive a coupling nut 45, and the pump rod 46 is connected thereto in the usual manner, a packing gland 47 being provided in the housing and through which the piston rod extends so that a leakproof joint is provided.

A suitable motor 48 is mounted on the housing in any approved manner, and a drive belt 49 connects the motor drive pulley 50 with the pulley 17, so that the shaft 15 can be driven to actuate the mechanism.

The stroke is adjusted by loosening the lock nut 42 so that the tubular rod 32 may be threaded into or out of the piston rod to suit the required stroke, after which the nut 42 is again tightened to secure the parts rigidly together.

In practice the housing 8 is partially filled with a suitable lubricant, the motor 48 is connected to a source of power, and the shaft 15 is driven. This in turn drives the chain dual 23, the lugs 38 engaging the cross head 31; this carries the piston 43 with it so that the piston rod 44 is reciprocated accordingly, the dashpots 33 absorbing all shocks as the lubricant or air is expelled at the end of each stroke.

I wish to direct particular attention to the fact that the driving means is easily and quickly adjustable, it provides for a straight line drive, practically all parts are standard and operate in oil so that noise is eliminated, and all parts subjected to wear are formed of hardened steel insuring long life with a minimum of wear.

From the foregoing description it will be obvious that I have perfected a very simple, practical, economical, and substantial driving mechanism for pumps, and which permits the length of stroke to be quickly and easily adjusted.

What I claim is:

1. A pump driving mechanism including a leakproof housing provided with spaced apart vertical guide rods, a piston rod, a tubular rod adjustably connected thereto, a cross head mounted on the guide rods, driving mechanism engageable with said cross head, a piston adjustably mounted on said tubular rod and engageable by said driving mechanism, and means for actuating said driving mechanism for reciprocating said tubular rod.

2. A pump driving mechanism of the class described and including a leakproof housing provided with spaced apart guide rods, a piston rod having a pump rod connected to the lower end thereof, a tubular rod adjustably connected to the upper end of said piston rod, a cross head mounted in the housing and adapted to engage said tubular rod, a yoke secured to said cross head, driving means mounted in said housing and engageable with said yoke, a piston on the upper end of the tubular rod and engageable by said cross head as the mechanism is actuated, and means for reciprocating said piston rod.

3. A pump driving mechanism of the class described and including a leakproof housing, a tubular rod, a piston rod adjustably connected to the lower end thereof, a cross head mounted on the upper end of the tubular rod and provided with a yoke, driving mechanism mounted in the housing and engaging said yoke, a piston on the upper end of the tubular rod and adapted to be actuated to adjust the tubular rod in the piston rod to vary the pump stroke, and means for actuating said mechanism for reciprocating said piston rod.

4. A pump driving mechanism of the class described and including a leakproof housing, a tubular rod mounted therein, a piston rod adjustably connected to the lower end thereof, spaced apart guides, a cross head mounted thereon and engageable with said tubular rod, a yoke connected to said cross head, a drive chain adjacent said rod and engageable with the yoke, means on the upper end of the tubular rod and adapted to be rotated to adjust the tubular rod in the piston rod for adjusting the stroke of the pump, and means for driving said chain for reciprocating said piston rod.

5. A pump driving mechanism of the class described and including a housing, spaced apart horizontally disposed shafts mounted therein, a drive chain connecting said shafts, a tubular rod mounted in the housing, a piston rod adjustably connected to the lower end of the tubular rod, a piston rigidly mounted on the upper end of the tubular rod for adjusting said tubular rod in the piston rod, spaced apart guides, a cross head mounted thereon and including a yoke, dashpots in the cross head, a projecting lug on the drive chain and engageable with said yoke, and means for driving said chain to reciprocate said piston rod.

6. A pump driving mechanism of the class described and including a leakproof housing, spaced apart shafts journaled therein, a drive chain connecting said shafts, a tubular rod, a piston rod adjustably connected thereto, a castellated piston rigidly mounted on the upper end of the tubular rod for turning said rod and adjusting it in the piston rod to vary the stroke of the pump, guide rods in the housing, a cross head mounted thereon and provided with a vertically split yoke, a driving lug on the drive chain and engaging said yoke, means for driving said chain, and means for adjusting said drive chain.

7. A pump driving mechanism of the class described and including a housing, vertically spaced shafts journaled thereon, a drive chain connecting said shafts, a tubular rod mounted in the housing, a piston mounted on the rod, a piston rod adjustably connected to the tubular rod, guide rods in the housing, a cross head mounted thereon, dashpots formed on the cross head, a yoke connected to said cross head and provided with pockets engageable by said drive chain, and means for driving said drive chain for reciprocating said piston rod.

JOHN P. FRENCH.